United States Patent [19]

Maeda

[11] Patent Number: 4,480,278

[45] Date of Patent: Oct. 30, 1984

[54] RECORDING AND REPRODUCING APPARATUS FOR VIDEO SIGNALS

[75] Inventor: Masaya Maeda, Kanagawa, Japan

[73] Assignee: Canon Kabushiki Kaisha

[21] Appl. No.: 347,196

[22] Filed: Feb. 9, 1982

[30] Foreign Application Priority Data

Feb. 17, 1981 [JP] Japan ................................ 56-21858

[51] Int. Cl.³ ............................................ G11B 15/46
[52] U.S. Cl. ..................... 360/73; 360/33.1; 360/10.3; 358/190; 358/335
[58] Field of Search .................. 360/33.1, 69, 73, 137, 360/10.1, 10.3; 358/906, 335, 190

[56] References Cited

U.S. PATENT DOCUMENTS

| | | | |
|---|---|---|---|
| 3,873,846 | 3/1975 | Morio | 358/190 |
| 3,878,326 | 4/1975 | Fitzgerald | 358/190 |
| 3,974,522 | 8/1976 | Fukatsu | 358/906 |
| 4,386,376 | 5/1983 | Takimoto | 358/335 |
| 4,400,743 | 8/1983 | Takimoto | 358/335 |

*Primary Examiner*—Alan Faber
*Attorney, Agent, or Firm*—Toren, McGeady and Stanger

[57] ABSTRACT

An apparatus for recording and reproducing video signals on a recording medium includes a mechanism for transporting the recording medium with respect to recording and reproducing elements of the apparatus. A control arrangement operates to control the speed of movement of the transport mechanism in response to a supply of electrical power, and selecting circuitry is arranged to select a particular electrical power source to supply the electrical power to the control arrangement.

34 Claims, 5 Drawing Figures

RECORDING AND REPRODUCING APPARATUS FOR VIDEO SIGNALS

BACKGROUND OF THE INVENTION

1. Field of Invention:

This invention relates to video signal recording and reproducing apparatus capable of permitting recordings out of doors and capable of variable speed reproduction.

2. Description of the Prior Art:

The present invention may be embodied in the following example of a conventional magnetic recording and reproducing apparatus using magnetic tape as the recording medium (hereinafter referred to as "VTR").

The conventional VTR operates in such a manner that a magnetic tape is brought into contact against a cylindrical tape guide including a magnetic head over a predetermined angular distance, and, while video signals are being recorded on said tape for every one field or two fields in one of the successively formed inclined tracks, the tape is transported at a constant speed when the aforesaid video signals are being recorded or reproduced.

When reproducing the thus-recorded video signals on the magnetic tape, the tape may be transported at a different speed from that at which the recording was made, thereby slow motion, high speed reproduction and other speed-changed reproductions are made possible. The aforesaid high speed reproduction is advantageous for skipping an identified portion of the recorded tape, or searching.

When in normal recording or reproducing operation, it is customary in the conventional VTR or tape recorder that a pinch roller and a capstan contact across the magnetic tape, and the aforesaid capstan is driven to rotate by an electric motor or other suitable drive source, thus running the tape.

Also for high speed reproduction in addition to the normal speed, there are known two methods of transporting the tape at high speed. One method is that after the tape is taken out of contact with the pinch roller and capstan, the reel-driving rotors are caused to rotate at a high speed, or the so-called "fast" feed or "fast" rewind mode is set on the VTR to carry out high speed reproduction. The other method is that the capstan is caused to rotate at a higher speed than when in the normal recording or reproducing mode.

The former method, owing to the fact that the running speeds of the tape when in the fast feed and fast rewind modes are generally considerably higher than when in the recording mode, is relatively easy to realize for high speed reproduction. However, it has a disadvantage in that as the diameter of the wound tape changes, the running speed of the tape changes correspondingly.

The latter method, because the tape speed depends upon the number of revolutions of the capstan motor, does provide for a small change in the running speed. However, since the number of revolutions of the capstan motor depends upon the drive voltage, and because, in the case of a portable type VTR utilizing a battery, the availability of the electrical power source is limited, it has been found that in actual practice high speed reproduction cannot be carried out at greatly increased speeds.

SUMMARY OF THE INVENTION

The present invention has been made to eliminate the above-described drawbacks and, if embodied in a VTR, will provide a type of VTR in which, when in a reproducing mode, the tape speed is selectively controlled by obtaining at least two voltages. The capstan motor is arranged to operate, when in the reproducing mode, with either the same voltage as in the recording mode, with the tape transport moving at the same speed as in recording, or with a higher voltage than the aforesaid voltage to move the tape transport at a higher speed.

DETAILED DESCRIPTION OF THE PREFERRED EMBODIMENTS

Figure 1:
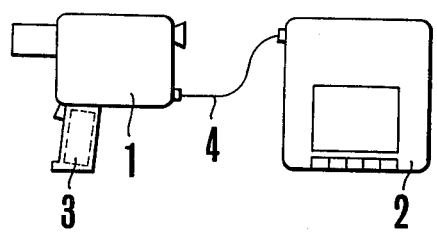
FIG. 1 is a side elevational view of an embodiment of a VTR according to the present invention, connected to a video camera.

In FIG. 1 there is shown a VTR according to an embodiment of the invention as connected with a video camera. The drawing shows the video camera 1, the VTR 2, and video battery 3 used as an electrical power source for the video camera and VTR. A cable 4 transmits video signals and electrical energy between the video camera 1 and the VTR 2 when recording is carried out.

Figure 2:
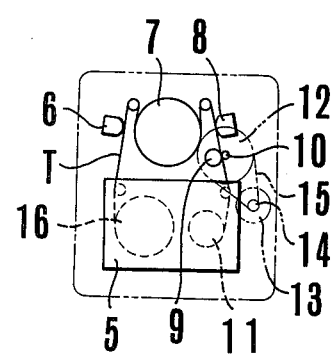
FIG. 2 illustrates the details of internal construction of the VTR.

FIG. 2 illustrates the internal construction of the VTR 2 where a magnetic tape T pulled out of a cassette 5 passes through a full width eraser head 6, a cylindrical tape guide 7 including a rotary magnetic head, and a control and sound recording and reproducing head 8 to be held across a pinch roller 9 and a capstan 10, and therefrom advanced to a takeup reel 11 within the cassette 5. A supply reel 16 is contained in the same cassette 5. The capstan 10 has a fly wheel 12 concentrically fixed thereto, said fly wheel 12 being rotatably connected to a pulley 14 fixed to a shaft of the capstan motor 13 by an endless belt 15.

Figure 3:
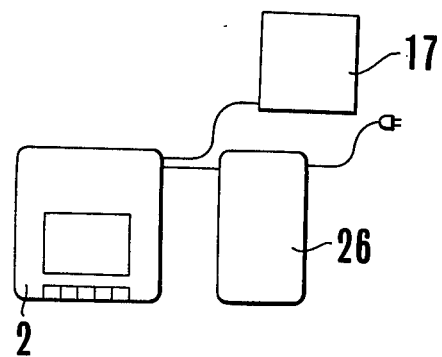
FIG. 3 illustrates the VTR in a reproducing position where an AC adapter and a television set are employed.

In FIG. 3, there is shown the VTR 2 of the invention as connected to an AC adapter 26 in a reproducing position, where a television set 17 is connected to an RF converter output terminal of the VTR 2.

Figure 4:
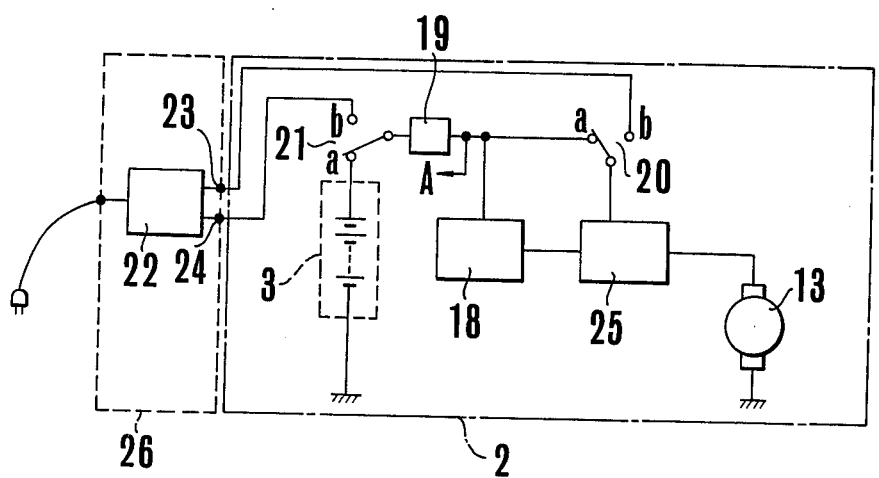
FIG. 4 is an electrical circuit diagram, partly in block form, of an embodiment of the VTR according to the present invention.

FIG. 4 is a block diagram illustrating an embodiment of the VTR according to the present invention. A DC source circuit 22 comprises a rectifier circuit receptive of a home alternating current source for producing DC current, and a constant voltage circuit for driving the VTR. Power terminals 23 and 24 are on the AC adapter 26 with the terminal 24 supplying a voltage almost equal to the voltage of the battery 3, and the terminal 23 supplying a higher voltage than that appearing at the terminal 24. FIG. 4 also shows a power source changeover switch 21; a constant voltage circuit 19; a capstan motor control circuit 18 for sensing and controlling the number of revolutions of the capstan motor 13; a capstan motor drive circuit 25 for driving the capstan motor 13; a mode changeover switch 20 having positions at which the motor 13 rotates at normal and high speeds for the normal reproduction modes and the high speed reproduction or high speed search mode, respectively.

The operation of this embodiment is next explained by reference to the drawings. When in recording, as illustrated in FIG. 1, the camera 1 and the VTR 2 are coupled with each other whereby the battery 3 serves as the power source for the capstan motor 13 of FIG. 2. This VTR 2 may be otherwise of a unified form incorporating the camera 1 therein, and the battery 3 may be otherwise located in the VTR 2.

In FIG. 4, the electrical power supplied from the battery 3 is applied through the switch 21 in its "a" position to the constant voltage circuit 19 and therefrom through an electrical power supply line A to a signal processing circuit (not shown) and the capstan motor control circuit 18, and further therefrom through the changeover switch 20 in its "a" position to the capstan motor drive circuit 25. The capstan motor control circuit 18 operates in such a manner that the speed of rotation of the capstan motor 13 is adjusted to a predetermined level as sensed. The capstan motor control circuit 18 forms a closed loop together with the capstan motor drive circuit 25 and the capstan motor 13 so that fine adjustment of the aforesaid speed of rotation is controlled.

When the thus recorded magnetic tape is to be reproduced, a unit including the DC source, for example, an AC adapter, tuner or the like is coupled to the VTR, and the switch 21 is moved to its "b" position where the DC electrical power source circuit 22 serves as the electrical power source for the VTR.

It is of course possible that even when in recording, if there is no need to use the battery 3, for example, when indoor shooting, or recording of television signals is made, instead of using the battery, the DC electrical power source circuit 22 can be used as the electrical power source.

When in the normal reproduction, the electrical power source changeover switch 21 is moved to its "b" position and the mode changeover switch 20 is left unchanged from "a" position, thus energizing the motor 13. As illustrated in FIG. 2, while the control signals recorded in the vicinity of the edge of the tape T are being reproduced by the control head 8, the video signal tracks which are slant recorded on the magnetic tape T in sequence, are traced to be reproduced by the rotary head incorporated in the cylindrical tape guide 7. At this time, the capstan motor 13 is driven by the same voltage as in the normal recording, and its speed is controlled in the above-described manner.

Further, when high speed searching is desired, setting of the high speed search mode causes the switch 20 to be moved to "b" position where the high voltage for the high speed search is supplied from the terminal 23 of the AC adapter 26 so that the capstan 10 rotates at the higher speed than when in the normal reproduction mode, thus permitting high speed reproduction.

Figure 5:
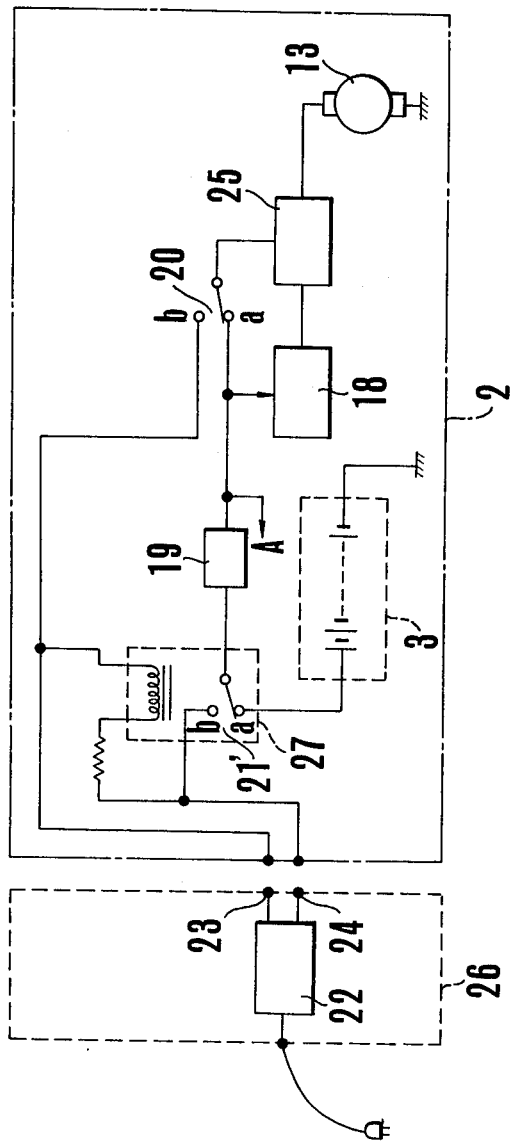
FIG. 5 illustrates another embodiment of the VTR according to the present invention.

FIG. 5 illustrates another embodiment of the VTR according to the present invention where the same reference characters have been employed to denote similar parts to those shown in FIG. 4. A relay 27 is responsive to flow of current for setting a switch 21' in "b" position, and responsive to no flow of current will set the switch 21' in "a" position.

According to the construction of this embodiment, upon connection of an AC adapter 26 or other suitable external electrical power source, the relay 27 is supplied with current, thereby the switch 21' is automatically changed over to "b" position to render the VTR cooperative with the external electrical power source.

As has been described above, according to the present invention, the range of selectively controllable tape speeds when in the reproduction mode can be extended remarkably by the use of means of very simple construction, and further the use of an external electrical power source makes it possible to increase the tape speed for the high speed reproduction by the capstan drive. Moreover, with the limitation of the occurrences of using the battery to outdoor recordings, premature consumption of electrical energy of the battery can be prevented. Since this can be achieved by providing a changeover switch of simple structure, it does not involve an increase of the circuit volume in the VTR. Thus, the present invention has a great advantage at the portable VTR.

What is claimed is:

1. A video signal recording and reproducing apparatus, comprising:
    (a) recording means for recording video signals on a recording medium;
    (b) reproducing means for reproducing the video signals from the recording medium;
    (c) moving means for moving the recording medium;
    (d) connecting means for connecting an external electrical power source to the apparatus;
    (e) internal means for connection to an internal electrical power source;
    (f) generating means for producing a first constant voltage;
    (g) first selective means for selectively supplying to said generating means first electrical power obtained from the internal electrical power source through said internal means and second electrical power obtained from the external electrical power source through said connecting means; and
    (h) second selective means for selectively supplying to said moving means said first constant voltage and a second constant voltage which is higher than said first constant voltage and is obtainable from the external electrical power source.

2. An apparatus according to claim 1, wherein when the external electrical power source is connected to the apparatus by said connecting means, said first selective means supplies that electrical power which is obtained from said external electrical power source to said generating means.

3. An apparatus according to claim 1, wherein when said external electrical power source is not connected to said connecting means, said first selective means supplies that electrical power which is obtained from the internal electrical power source at said internal means to said generating means, and said second selective means supplies said first constant voltage to said moving means.

4. An apparatus according to claim 1, further comprising:
    manually operable means for setting the moving speed of the recording medium by said moving means, said means being able to set the moving speed of the recording medium in at least a predetermined first speed and a second speed.

5. An apparatus according to claim 4, wherein said second selective means operates in response to said manually operable means.

6. An apparatus according to claim 5, wherein when said external electrical power source is not connected to said connecting means, said manually operable means is inhibited from setting the moving speed of the recording medium in said second speed.

7. An apparatus according to claim 6, wherein when said manually operable means sets the moving speed of the recording medium in said first speed, said second selective means supplies said first constant voltage to said moving means.

8. An apparatus according to claim 7, wherein when said manually operable means sets the moving speed of the recording medium in said second speed, said second selective means supplies said second constant voltage to said moving means.

9. An apparatus as in claim 4 wherein the second speed is faster than the first speed.

10. A video signal recording and reproducing system, comprising:
   (a) recording means for recording video signals on a recording medium;
   (b) reproducing means for reproducing the video signals from the recording medium;
   (c) generating means for selectively producing a first constant voltage and a higher second constant voltage than the first constant voltage;
   (d) moving means receptive of the voltage produced from said generating means for moving the recording medium;
   (e) first connecting means connectable to a first electrical power source;
   (f) second connecting means connectable to a second electrical power source capable of producing a larger electrical power than that of said first electrical power source; and
   (g) selective means for selectively supplying to said generating means electrical power from said first electrical power source at the first connecting means and additional electrical power from the second electrical power source at the second connecting means so that when said selective means supplies the electrical power from said first electrical power source to said generating means, said generating means produces said first constant voltage.

11. A system according to claim 10, further comprising:
   manually operable means for setting the moving speed of the recording medium by said moving means in at least a first speed and a second speed faster than said first speed.

12. A system according to claim 11, wherein said generating means operates in response to said manually operable means.

13. A system according to claim 12, wherein when said manually operable means sets the moving speed of the recording medium in said first speed, said generating means produces said first constant voltage.

14. A system according to claim 13, wherein when said manually operable means sets the moving speed of said recording medium in said second speed, said generating means produces said second constant voltage.

15. An apparatus as in claim 11, wherein the second speed is faster than the first speed.

16. A video signal recording and reproducing system, comprising:
   (a) recording means for recording video signals on a magnetic tape;
   (b) reproducing means for reproducing the video signals from the magnetic tape;
   (c) moving means for moving the magnetic tape;
   (d) a first voltage source means for generating a first voltage;
   (e) second voltage source means for generating a second voltage nearly equal to said first voltage and a third voltage higher than said second voltage;
   (f) voltage generation means for generating a fourth voltage by selectively using said first voltage and said second voltage; and
   (g) selective means for selectively supplying said moving means with said third voltage and said fourth voltage.

17. A system according to claim 16, further comprising:
   first manually operable means for rendering said recording means operative, and wherein when said recording means operates by said means, said moving means moves the magnetic tape at the predetermined first speed, and said selective means supplies said moving means with said fourth voltage.

18. A system according to claim 17, further comprising:
   second manually operable means for rendering said reproducing means operative.

19. A system according to claim 18, further comprising:
   third manually operable means for setting the moving speed of the magnetic tape by said moving means, said means being able to operate when said reproducing means operates in response to said second manually operable means.

20. A system according to claim 19, wherein said selective means operates in response to said third manually operable means.

21. A system according to claim 20, wherein said third manually operable means is able to set the moving speed of the magnetic tape in at least said first speed and a faster second speed than said first speed.

22. A system according to claim 21, wherein when said third manually operable means sets the moving speed of the magnetic tape in said first speed, said selective means supplies said moving means with said fourth voltage, and when it said second speed, said second selective means supplies said moving means with said third voltage.

23. A video signal recording and reproducing apparatus, comprising:
   (a) recording and reproducing means for recording video signals on a recording medium and for reproducing the video signals from the recording medium;
   (b) housing means for housing a first electrical power source;
   (c) connecting means for connecting a second electrical power source with the apparatus;
   (d) selective means for supplying said recording and reproducing means selectively with electrical power obtained from said first electrical power source and other electrical power obtained from said second electrical power source; and
   (e) controlling means for controlling said selective means in such a manner that the electrical power obtained from said second electrical power source is supplied to said recording and reproducing means in response to connection of said second electrical power source to said connecting means.

24. An apparatus according to claim 23, further comprising:
generating means for generating a predetermined voltage formed by using the electrical power supplied from said selective means and being supplied to said recording and reproducing means.

25. An apparatus according to claim 23, wherein said first electrical power source includes a battery.

26. An apparatus according to claim 23, wherein said control means operates with the use of the electrical power obtained from said second electrical power source.

27. An apparatus according to claim 26, wherein said control means includes a relay circuit.

28. An apparatus according to claim 27, wherein said connecting means includes two connection terminals, and said relay circuit is connected between said two connection terminals.

29. A video signal recording and reproducing system, comprising in combination
(a) a first electrical power source;
(b) a first apparatus including a second electrical power source;
(c) a second apparatus including;
recording and reproducing means for recording a video signal on a recording medium and for reproducing the video signal from the recording medium; and
housing means for housing said first electrical power source;
(d) connecting means for connecting said second apparatus with said first apparatus;
(e) selective means for supplying said recording and reproducing means selectively with an electrical power obtained from said second electrical power source and another electrical power obtained from said first electrical power source; and
(f) control means responsive to connection of said first apparatus with said second apparatus by said connecting means for controlling said selective means in such a manner that the electrical power obtained from said second electrical power source is supplied to said recording and reproducing means.

30. A system according to claim 29, wherein said selective means is incorporated in said second apparatus.

31. A system according to claim 29, wherein said control means is incorporated in said second apparatus.

32. A system according to claim 29, wherein said first electrical power source includes a battery.

33. A system according to claim 29, wherein said second electrical power source includes a A.C. adapter.

34. A system according to claim 29, wherein said controlling means includes a relay circuit.

* * * * *